United States Patent
Yanagihara et al.

(10) Patent No.: US 6,697,432 B2
(45) Date of Patent: *Feb. 24, 2004

(54) PROCESSING OF PACKETS IN MPEG ENCODED TRANSPORT STREAMS USING ADDITIONAL DATA ATTACHED TO EACH PACKET

(75) Inventors: Naofumi Yanagihara, Tokyo (JP); Takehiko Nakano, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/901,289

(22) Filed: Jul. 31, 1997

(65) Prior Publication Data

US 2003/0133509 A1 Jul. 17, 2003

(30) Foreign Application Priority Data

Aug. 6, 1996 (JP) .......................................... 08-223086

(51) Int. Cl.[7] ................................................ H04N 7/26
(52) U.S. Cl. .............................. 375/240.26; 375/240.28
(58) Field of Search .............................. 348/461, 423.1, 348/581, 468, 464; 386/95, 83, 124, 75, 98, 111, 428.1, 425.2; 725/132, 131, 68; 375/240.26, 240.28, 240.27

(56) References Cited

U.S. PATENT DOCUMENTS

| 5,285,497 | A | * | 2/1994 | Thatcher, Jr. ............. 348/425.2 |
| 5,287,182 | A | * | 2/1994 | Haskell et al. .............. 348/500 |
| 5,319,707 | A | * | 6/1994 | Wasilewski et al. ........ 348/473 |
| 5,565,924 | A | * | 10/1996 | Haskell et al. .............. 348/423 |
| 5,619,337 | A | * | 4/1997 | Naimpally .................... 386/83 |
| 5,635,989 | A | * | 6/1997 | Rothmuller .................. 725/132 |
| 5,703,877 | A | * | 12/1997 | Nuber et al. ................. 370/395 |
| 5,801,781 | A | * | 9/1998 | Hiroshima et al. ......... 348/441 |
| 5,838,873 | A | * | 11/1998 | Blatter et al. ................. 386/95 |
| 5,844,636 | A | * | 12/1998 | Joseph et al. ............... 348/845 |
| 5,847,771 | A | * | 12/1998 | Cloutier et al. ............. 348/564 |
| 5,899,578 | A | * | 5/1999 | Yanagihara et al. .......... 386/75 |
| 5,940,148 | A | * | 8/1999 | Joseph et al. ............... 348/845 |
| 6,115,074 | A | * | 9/2000 | Ozkan et al. ................ 348/465 |
| 6,332,057 | B1 | * | 12/2001 | Kawamura et al. ........... 386/95 |
| 2001/0041056 | A1 | * | 11/2001 | Kawamura et al. ........... 386/95 |

* cited by examiner

Primary Examiner—Victor R. Kostak
(74) Attorney, Agent, or Firm—Frommer Lawrence & Haug LLP; William S. Frommer; Hans R. Mahr

(57) ABSTRACT

At least one program is selected from MPEG encoded transport streams carrying a plurality of packets, and is recorded/reproduced without a need to determine the contents of those transport streams. When an MPEG encoded transport stream containing at least one program is selected, additional data is attached to each packet of this transport stream. The additional information indicates how many programs are contained in the selected MPEG encoded transport stream; indicates an error in the MPEG encoded transport stream; and indicates a transition point representing a beginning of a program in the MPEG encoded transport stream.

18 Claims, 7 Drawing Sheets

FIG. 4A
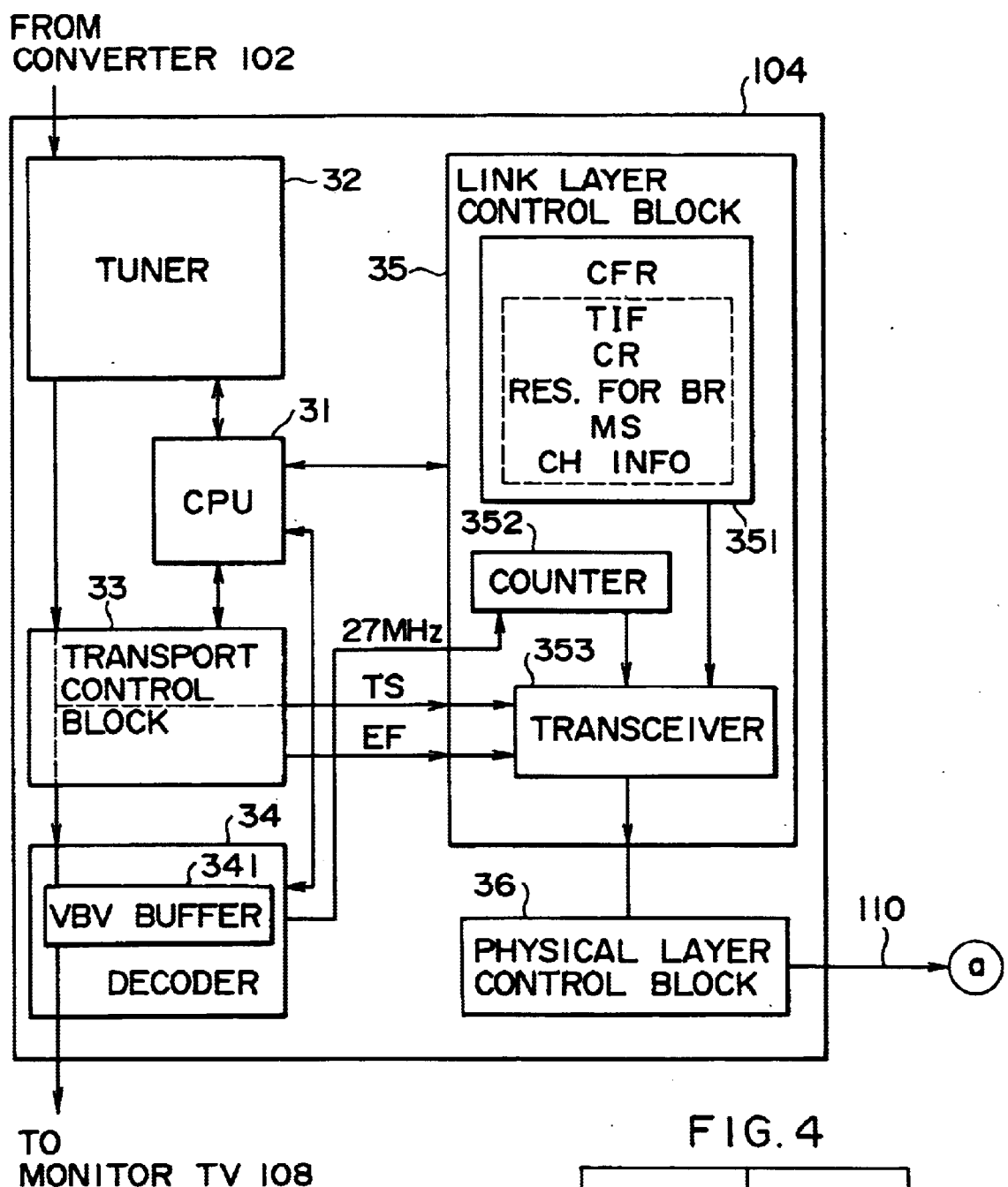
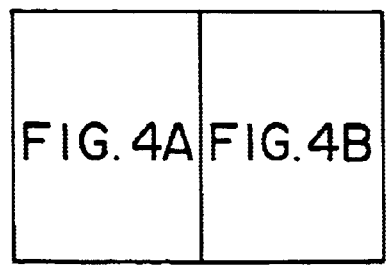
FIG. 4

| FIG.5A | FIG.5B |

PROCESSING OF PACKETS IN MPEG ENCODED TRANSPORT STREAMS USING ADDITIONAL DATA ATTACHED TO EACH PACKET

BACKGROUND OF THE INVENTION

The present invention is related to MPEG (Moving Picture Experts Group) encoded transport streams containing multiple programs and, in particular, apparatus and method for selecting at least one program from the MPEG encoded transport stream, and for recording and reproducing the program without a need to determine the program contents of that stream.

Recently, in the U.S. and Europe, a system has been introduced for encoding video and audio signals, transmitting the encoded signals via a communications satellite and decoding the encoded signals at a receiving side for subsequent use by subscribers. A high efficiency encoding technique, such as the MPEG, for example, may be used in such a system, where a receiver is typically referred to as a set top box.

In accordance with this system, a transport stream carrying varying programs is received via an antenna; a converter converts the received transport stream to another frequency (a down-conversion operation); and a transport stream corresponding to a desired program (channel) is selected from the multiple channel transport streams. Next, video data and audio data from the selected program (channel) are separated from each other and subsequently decoded by a decoder. The decoded video and audio data are then transmitted to a conventional monitor or an analogue video tape recorder (VTR) for viewing or recording of the program, respectively.

It is known that digital recording/reproducing devices can record encoded bit stream data and then reproduce the encoded data for a subsequent decoding operation. Namely, the encoded bit stream data are not decoded prior to the recording/reproducing operations. It is desirable for these digital recording/reproducing devices to record/reproduce the encoded transport stream of the digital broadcast in order to prevent degradation of the picture quality during the recording/reproducing operations. In this case, the encoded picture reproduced by a digital recording/reproducing device maintains the same quality as when it is received by the set top box.

Since the transport stream is encoded, however, information about its program contents is not known, except that the length of a transmission packet is typically 130 bytes. If such a transport stream is recorded as it is (that is, without decoding) and then later reproduced, the transport stream can not be properly decoded by the decoder because it is unknown how many programs have been recorded by the digital recording/reproducing device.

A need therefore exists for a device that overcomes the above disadvantage.

OBJECTS OF THE INVENTION

It is therefore an object of the present invention to select, record and reproduce an encoded MPEG transport stream.

Another object of the present invention is to provide a system including an antenna, a converter, a set top box, a digital recording/reproducing device, and a monitor TV for selecting, recording and reproducing an encoded MPEG transport stream.

It is a further object of the invention to select an MPEG encoded transport stream from multiple MPEG encoded transport streams and to add additional data to the program contents of each of the packets in the selected MPEG encoded transport stream for correct reproduction and decoding.

SUMMARY OF THE INVENTION

According to one aspect, the invention includes a system for processing an MPEG encoded transport stream carrying packets with program contents. The system includes an antenna for receiving the MPEG encoded transport stream transmitted at a first frequency; a converter connected to the antenna for converting the MPEG encoded transport stream to a second frequency different from the first frequency; apparatus, such as a set top box, connected to the converter for processing the converted MPEG encoded transport stream such that each of the packets has additional data added to its program contents; a digital recording/reproducing device connected to the set top box for recording/reproducing the additional data with each of the packets; and a monitor TV connected to the set top box for displaying the program contents after the recorded additional data with each of the packets are reproduced by the digital recording/reproducing device and are decoded by the set top box.

In accordance with another aspect of the invention, the additional data includes (1) information for indicating how many programs are contained in the MPEG encoded transport stream; (2) information for indicating an error in the MPEG encoded transport stream; and (3) information for indicating a transition point representing a beginning of a program in the MPEG encoded transport stream.

In accordance with still another aspect of the invention, each of the packets conforms to an IEEE 1394 standard.

In accordance with yet another aspect of the invention, a method is provided for processing MPEG encoded transport streams, each carrying packets with program contents. The method includes the steps of selecting an MPEG encoded transport stream and attaching additional data to the program contents of each of the packets in the selected MPEG encoded transport stream.

The above and other objects, features and advantages of the present invention will become more apparent from the accompanying drawings, in which like reference numerals are used to identify the same or similar parts in several views.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which.

In all Figures, like reference numerals represent the same or identical components of the invention.

DETAILED DESCRIPTION OF THE PREFERRED EMBODIMENTS

The invention will now be explained in detail with reference to the accompanying drawings.

As a general overview of the present invention, when a transport stream of at least one program is selected from the MPEG encoded transport streams containing multiple programs, certain additional data is added to each packet of the selected transport stream prior to the recording operation. Such processing of each packet allows for proper decoding of MPEG encoded data upon the reproduction from the digital recording/reproducing device. The additional data recorded for each packet of the selected transport stream includes: (1) information for indicating an error in the packet; (2) information for indicating the number of selected programs; and (3) information for indicating a transition point (to be explained hereinbelow) in the transport stream. As a result, the recorded/reproduced transport stream can be decoded without the need to determine its actual program contents.

Figure 1:
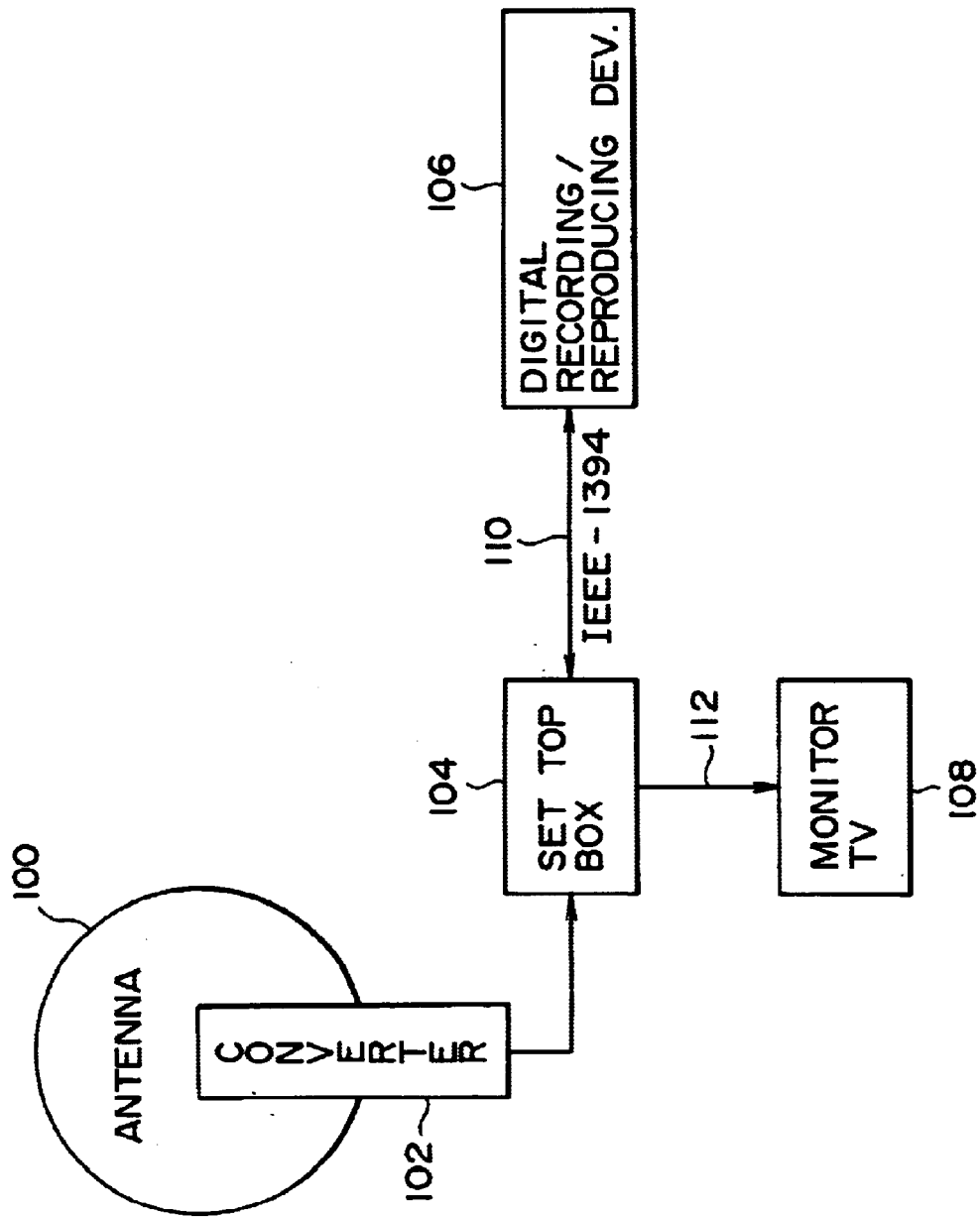
FIG. 1 is a block diagram of a digital broadcast receiving system in accordance with the present invention.

FIG. 1 is a block diagram of a digital broadcast receiving system in accordance with the present invention The system includes a parabolic antenna 100, a converter 102 connected to the parabolic antenna 100, a set top box 104 connected to the converter 102, a digital recording/reproducing device 106 for recording/reproducing encoded bit stream data, and a monitor TV 108. As shown in FIG. 1, an IEEE 1394 serial bus interface 110 provides data transfer between the set top box 104 and the digital recording/reproducing device 106, while Audio-Video (AV) cable 112 is a conduit for data transmission between the set top box 104 and the monitor TV 108.

The converter 102 converts the digital broadcast signal received by the parabolic antenna 100 to the RF signal having a first intermediate frequency. The RF converted signal is then transmitted by the converter 102 to the set top box 104, which converts it to a signal having a second intermediate frequency including encoded transport streams carrying multiple programs. Thereafter, the encoded transport streams of one or more desired programs is separated and demodulated by the set top box 104.

Next, the demodulated data is supplied to the digital recording/reproducing device 106 through the IEEE 1394 serial bus interface 110 for selectively recording the programs on a recording medium. In response to the subscriber's request, for example, the encoded transport stream previously recorded by the digital recording/reproducing device 106 is reproduced and supplied to the set top box 104 through the IEEE 1394 serial bus interface 110. The set top box 104 decodes the MPEG encoded transport stream and sends, via the AV cable 112, the decoded data for display on the monitor TV 108 as picture and audio information.

Alternatively, instead of providing the encoded transport stream to the digital recording/reproducing device 106 for recording and subsequent reproducing operations, the demodulated data is decoded by the set top box 104 as soon as the data is received, thereby providing analog video and audio signals. These signals are then supplied to the monitor TV 108 through the AV cable 112 for viewing video information and listening to the audio information.

Figure 2:
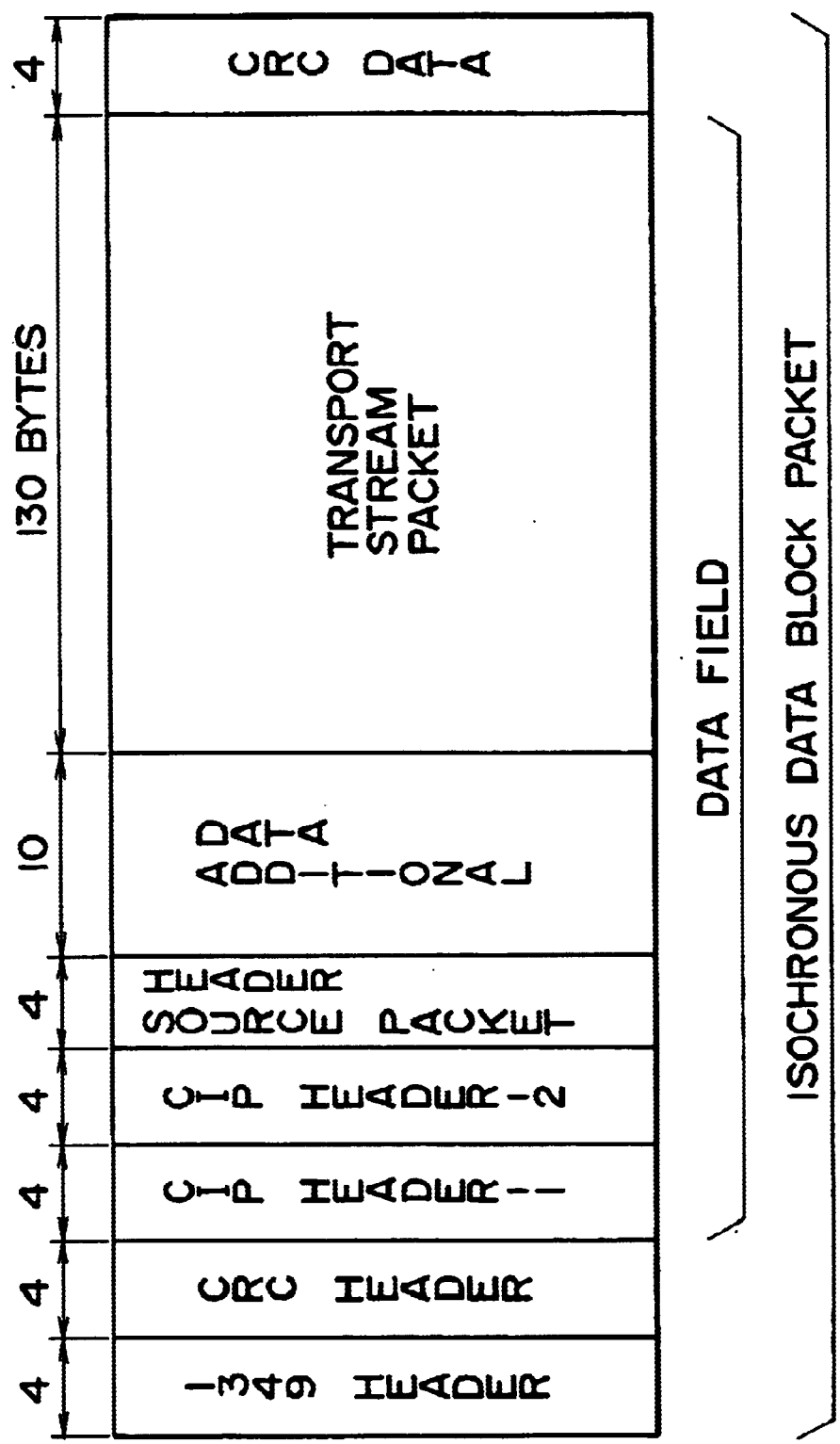
FIG. 2 illustrates a format of the packet transmitted between a set top box and a digital recording/reproducing device according to the present invention.

FIG. 2 illustrates a format of the packet transmitted between the set top box 104 and the digital recording/ reproducing device 106 according to the present invention. As previously stated, one representative format of the digital broadcast contains packets of the transport stream, where each packet is 130 bytes in length. As shown in FIG. 2, each 130-byte packet is preceded by a 1394 header of 4 bytes; a CRC header of 4 bytes; CIP headers 1 and 2 of 4 bytes each; a source packet header of 4 bytes; and additional data of 10 bytes to be described in detail hereinbelow. In addition, CRC data of 4 bytes is appended to this packet. As a result, an isochronous data block packet of 164 bytes is formed in conformance with the IEEE 1394 standard.

Figure 3:
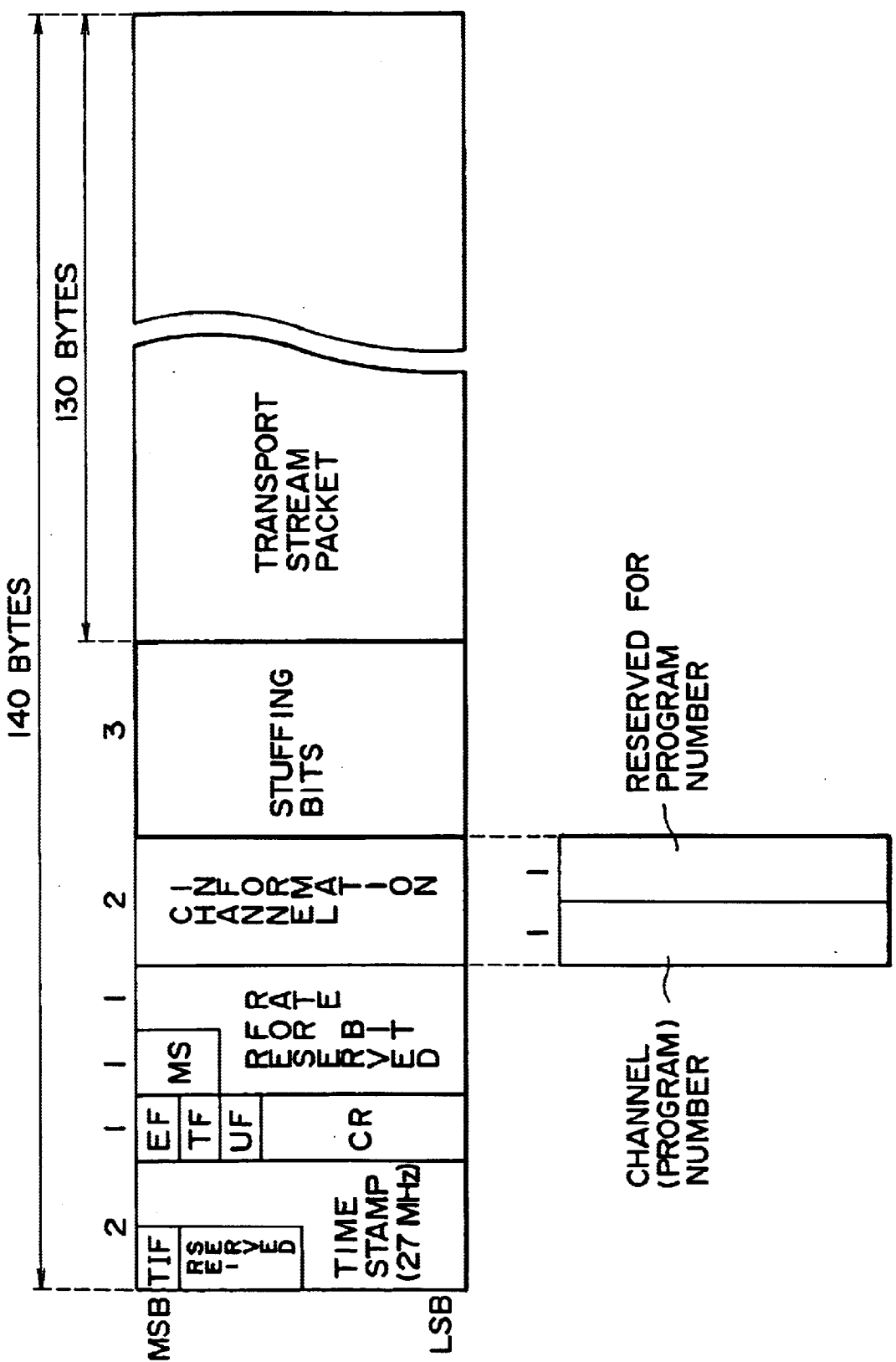
FIG. 3 further elaborates on FIG. 2 by showing in detail 10 bytes of additional data preceding the actual content information in the packet.

FIG. 3 further elaborates on FIG. 2 by showing, in detail, the additional data of 10 bytes (broken down for illustrative purposes as 2+1+1+1+2+3 bytes) immediately preceding the actual program content in the packet. This data contains information about the following items related to the packet transmission:

"TIF" (Time Stamp Invalid Flag) indicates whether the value contained in the time stamp field (27 MHz clock) is valid. This is a 1-bit field, where 1=invalid and 0=valid.

"27 MHz time stamp" of 12 bits provides a clock value (based on the 27 MHz clock in accordance with the MPEG standard) to a receiving device (such as the digital recording/reproducing device 106) under which a transmitting device (such as the set top box 104) operates. The transmitting device operates a 12 bit counter to obtain a clock value based on the 27 MHz clock, and stores this clock value at the head of the transport stream packet. The clock value is used for recording the transport stream, as explained below.

"EF" (Error Flag) is a 1-bit field for indicating whether the transmitted information contains an error, where "1"= error and "0"=no error.

"TF" (Transition Flag) is a 1-bit field for indicating the transition point in the transport stream, such as a junction of two records. Namely, when the recording operation stops and then restarts again, the transition point occurs. At the beginning of the recording operation, the digital recording/reproducing device 106 sets this bit and keeps it set for a predetermined period of time following the transition point. When the set top box 104 detects "1" in this field, it updates tables such as Program Association Table (PAT), Program Map Table (PMT), and Service Information Table (SIT) for proper decoding of the reproduced transport stream. These tables are also described in U.S. application Ser. No. 08/769,846 being assigned to the same assignee as this application and being incorporated herein by reference.

"UF" (Video Buffering Verifier (VBV) Underflow Flag) is a 1-bit field set to "1" when the digital recording/ reproducing device 106 performs a trick play during the data reproduction of the transport stream previously recorded on the recording medium. During the non-trick play reproduction, the "UF" flag is "0".

"CR" (Copyright) is a 5-bit field for containing copyright information on the program.

"MS" (Multi/Single) is a 2-bit field for indicating whether the MPEG encoded transport stream, recorded/ reproduced by the digital recording/reproducing device 106, contains a single channel or many channels. The following information is conveyed by this field:
"00": 1 channel
"01": undefined
"10": the entire transport streams
"11": no information (that is, no information is contained in the Channel Information field described hereinafter).

"Reserved for Bit Rate" (14 bits) is currently a free field. The transfer rate may be transmitted to the digital recording/reproducing device 106 for optimizing the recording rate if the transfer rate information is available in the transport stream.

"Channel Information" (8 or 16 bits) is contained in this field whose contents depend on the "MS" field described hereinabove. The "Channel Information" is a 16-bit field indicating the number of recording programs in the transport stream when the "MS" field is "00". When the MS field is "10", the "Channel Information" is 8 bits and indicates the number of channels (transponders). Eight bits are sufficient for representing the number of channels (transponders), but may be insufficient for the number of recording programs. Hence, the reserved byte is added to the low order 8 bits to form a 16-bit field corresponding to the "MS" field being "00".

"Stuffing" field of 3 bytes is added to the 130-byte packet such that the total length becomes an integral multiple of 4. This is due to the fact that the packet size is preferably an integral multiple of 4 when the data transmission is carried out according to the IEEE 1394 standard.

Figure 4B:
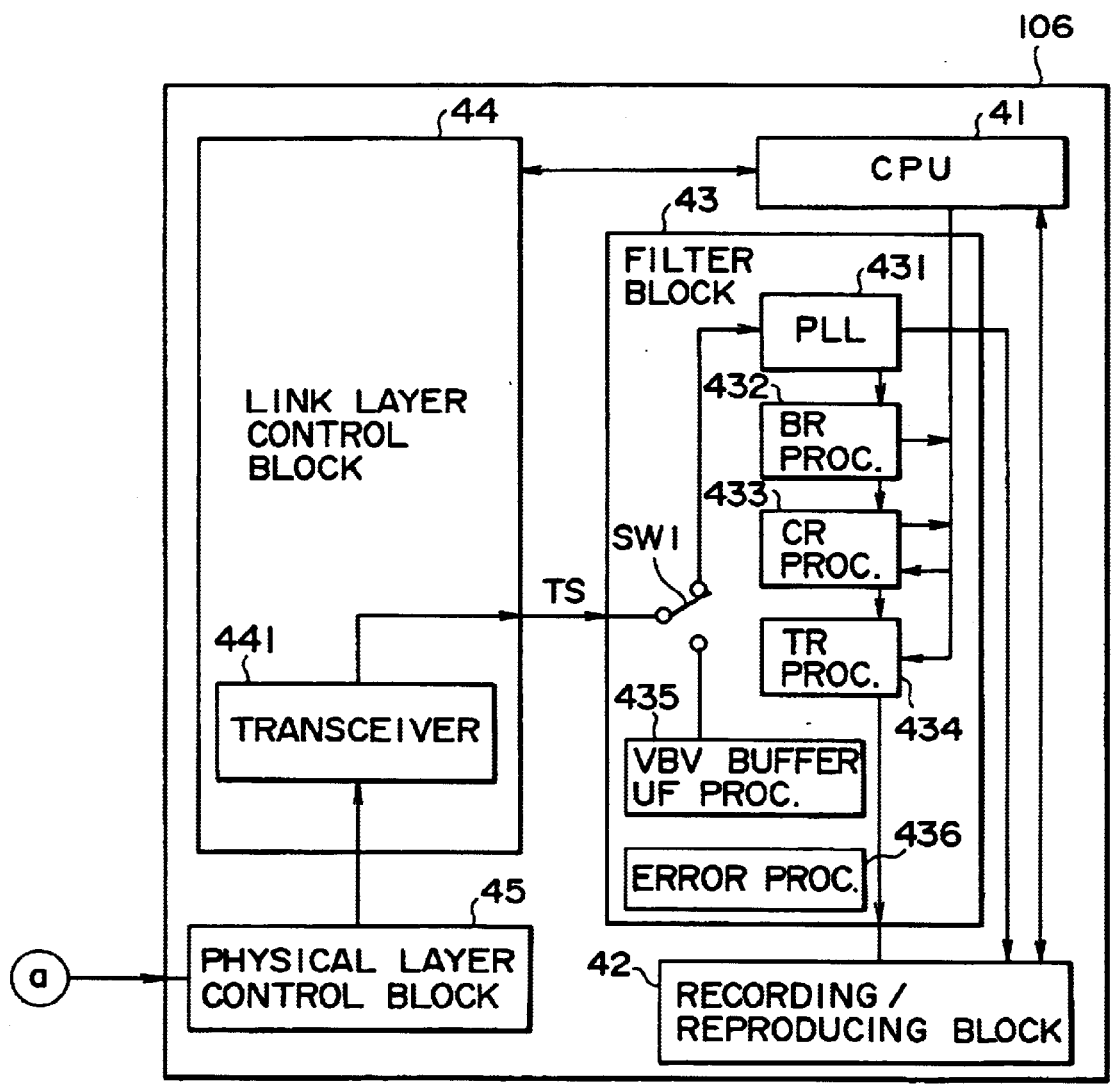
FIG. 4 is a block diagram showing data flow in the system for recording a digital transport stream received by the set top box and transmitted to the digital recording/reproducing device via the IEEE 1394 serial bus interface, in accordance with the present invention.

Next is the description of how the additional 10-byte data is generated and used in the system of FIG. 1. FIG. 4 is a block diagram of the system showing the transport stream of the digital broadcast being received by the set top box 104, and being transmitted to and recorded in the digital recording/reproducing device 106 (such as a D-VHS deck) using the IEEE-1394 serial bus interface 110. Identical reference characters are assigned to elements having the same or similar function in FIGS. 1 and 4.

As shown in FIG. 4, a CPU 31 controls the entire operation of the set top box 104. A tuner 32 receives an RF signal having the first intermediate frequency from the converter 102 and selects a second frequency signal containing the bit stream of one or more programs corresponding to the desired transponder. A transport control block 33 separates, demodulates, and descrambles the selected bit stream received from the tuner 32, and a decoder 34 decodes and converts the output data from the transport control block 33 to analog video and audio signals. The decoder 34 includes a Video Buffering Verifier (VBV) buffer 341 for temporarily storing the transport stream data during the decoding operation.

Further included in the set top box 104 are a link layer control block 35 and a physical layer control block 36, both comprising hardware circuits for processing signals in accordance with the IEEE 1394 standard. The link layer control block 35 has a configuration register (CFR) 351, a 12-bit counter 352 for counting cycles of the 27 MHz clock, and a transceiver 353.

Detailed description of the digital recording/reproducing device 106 follows next with reference to FIG. 4. As shown in FIG. 4, the digital recording/reproducing device 106, connected to the set top box 104 via the IEEE 1394 serial bus interface 110, has a CPU 41 for controlling its entire operation, a recording/reproducing block 42 for recording/reproducing the bit stream data, a filter block 43 for processing the bit stream data during the recording/reproducing operations, a link layer control block 44 and a physical layer control block 45, both comprising hardware circuits for processing signals in accordance with the IEEE 1394 standard.

Next, the system operation during the recording operation is described with reference to FIG. 4. The RF signal of the first intermediate frequency supplied from the converter 102 is inputted to the tuner 32 in the set top box 104 for obtaining the second intermediate frequency signal corresponding to the desired transponder. The second intermediate frequency signal containing one or several programs is provided to the transport control block 33 for performing data demodulation (using QPSK), an error correction, and a data descrambling operation. The decoder 34 then decodes the resulting transport stream received from the transport control block 33, whereby an analog video signal and an analog audio signal are transmitted to the monitor TV 108.

Further, the transport control block 33 outputs the selected transport stream (TS) of one or more programs and an error flag (EF), which indicates whether the transport stream packet contains an error, to the link layer control block 35. Also, the decoder 34 outputs the clock signal (27 MHz) to the link layer control block 35, as shown in FIG. 4.

In the CFR 351 of the link layer control block 35, the CPU 31 assigns values to the following fields based on the transport stream: "TIF", "CR", "Reserved for Bit Rate", "MS" and "Channel Information". This information is then transferred from the CFR 351 to the transceiver 353.

Further, in the link layer control block 35, the 12-bit counter 352 uses the 27 MHz clock (received from the transport control block 33) to provide a count value to the transceiver 353 for setting the time stamp value in the "27 MHz time stamp" field. Namely, after receiving the transport stream (TS) packet from the transport control block 33, the transceiver 353 obtains the value of the counter 352 and enters it as the "27 MHz time stamp". The error information of the packet is indicated in the "EF" flag, which is also received by the transceiver 353. In addition, information in the "TIF", "CR", "Reserved for Bit Rate", "MS" and "Channel Information" fields previously set in the CFR 351 are added to the packet of the transport stream by the transceiver 353.

Consequently, a packet having the format of FIG. 3 is converted by the transceiver 353 to the isochronous data block packet of FIG. 2, which is suitable for transmission according to the IEEE 1394 standard. The physical layer control block 36 then transfers the isochronous data block packet to the digital recording/reproducing device 106 via the IEEE 1394 serial bus interface 110.

The isochronous data block packet is received, via the IEEE 1394 serial bus interface 110, by the physical layer control block 45 in the digital recording/reproducing device 106. Namely, a transceiver 441 in the link layer control block 44 converts the isochronous data block packet to the format of FIG. 2, and supplies the converted packet from the link layer control block 44 to the filter block 43. If the packet contains errors in communication via the IEEE 1394 serial bus interface 110, then the link layer control block 44 changes the "EF" field to "1". If the error also pertains to the "27 MHz time stamp" field, then the "TIF" field is set to "1".

The filter block 43 receives the packet when a recording/reproducing switch SW1 is switched to the recording operation, as shown in FIG. 4. The following information from the "27 MHz time stamp", "TIF", "Reserved for Bit Rate", "CR", and "TF" field is accessed and/or modified, as explained hereinbelow.

The "TIF" field is used by a PLL 431, wherein if the value is "0", then the value in the "27 MHz time stamp" field is accessed, and a clock which is synchronous with the 27 MHz clock of the set top box 104 is generated based on that value. The generated clock is then supplied to the recording/reproducing block 42 for processing the transport stream during the recording operation.

Further, if the bit rate information is found in the "Reserved for Bit Rate" field, the bit rate processing block 432 obtains that bit rate information for use by the CPU 41. If the recording/reproducing block 42 can select among the recording rates, the CPU 41 changes the recording rate based on the bit rate of the transport stream for efficient use of the recording medium.

Next, a copyright information processing block 433 accesses the "CR" field and transfers the contents of this field to the CPU 41. Based on the contents of the "CR" field, the CPU 41 stops recording or, in the alternative, records and changes the "CR" field for providing the history of recording operations, if desired.

Further, during a predetermined period of time from the start of the recording operation, the "TF" flag is changed to "1" and sent to the recording/reproducing block 42. As a result, the decoder 34 can detect a transition point in the transport stream during the data reproduction. This field, as well as a VBV Buffer UF processing block 435 and an error processing block 436 will be described in detail hereinafter with reference to the reproducing operation, as illustrated in FIG. 5.

Consequently, the MPEG encoded transport stream having the packet structure as shown in FIG. 2 is sent to the recording/reproducing block 42 for recording to the recording medium.

Figures 5, 5A:
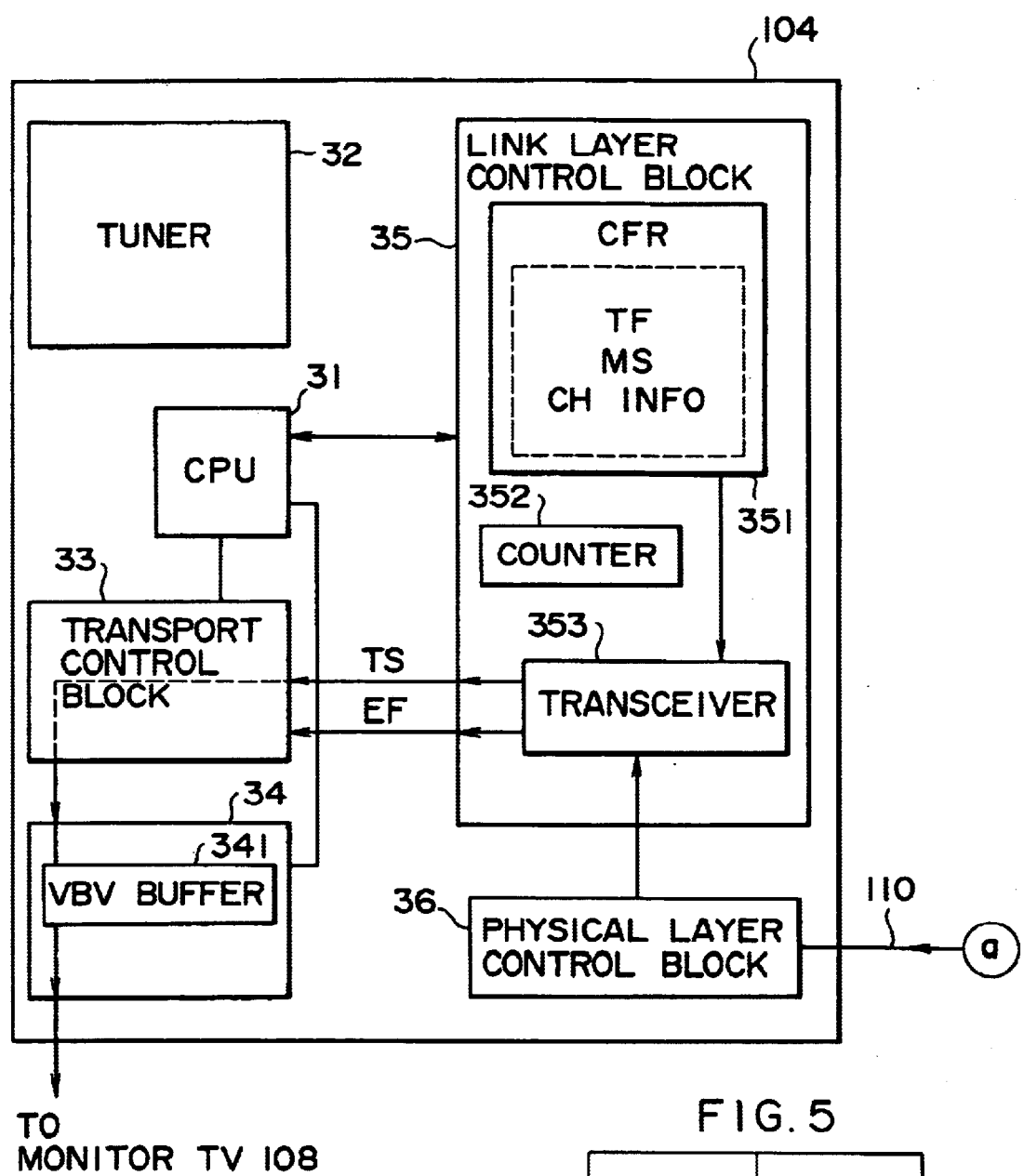
FIG. 5 is a block diagram showing data flow in the system for supplying to the set top box, via the IEEE 1394 serial bus interface, a digital transport stream reproduced by the digital recording/reproducing device, in accordance with the present invention.
Figure 5B:
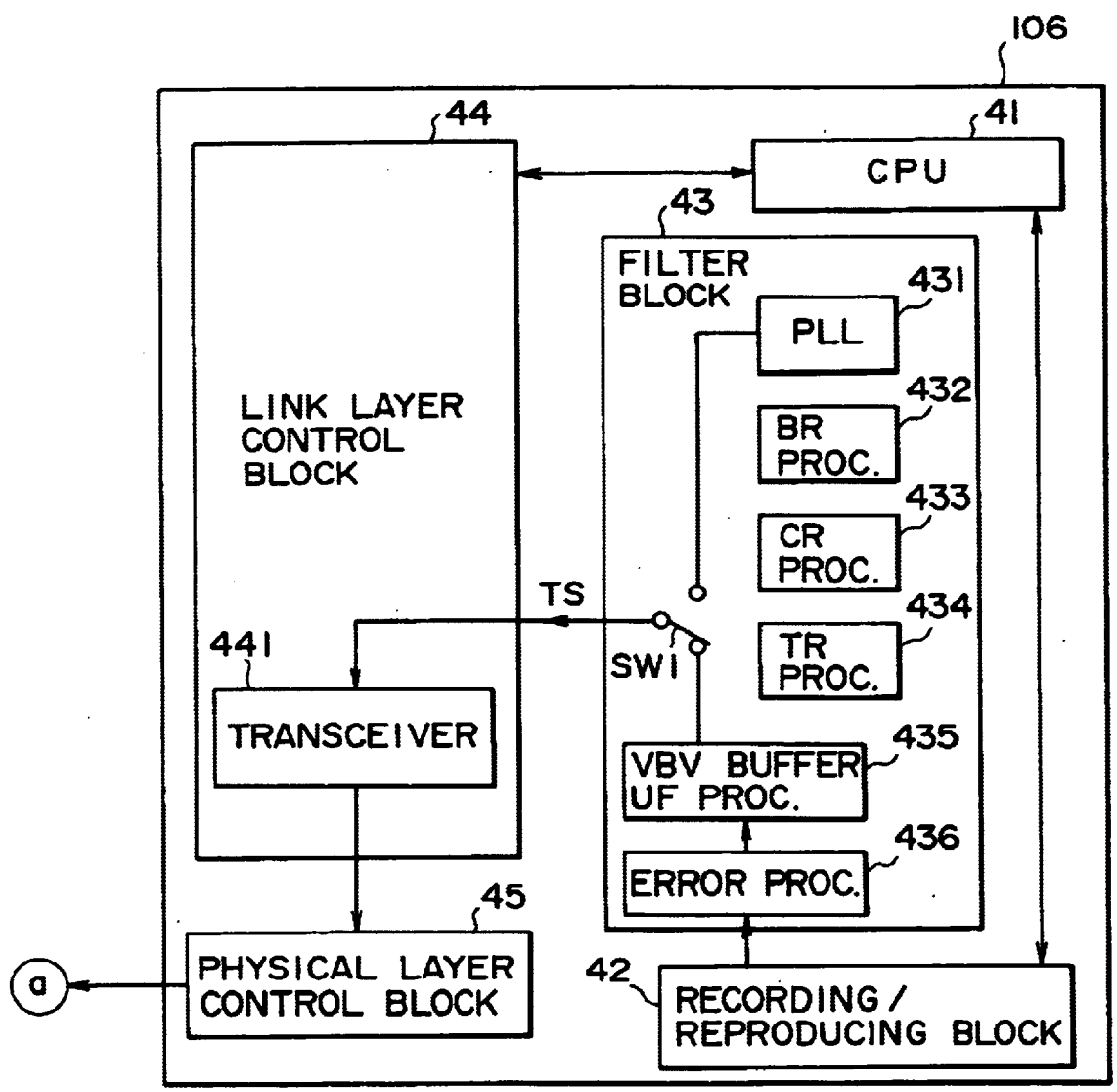

FIG. 5 is a block diagram showing data flow in the system for supplying to the set top box 104, via the IEEE 1394 serial bus interface 110, the digital transport stream reproduced by the digital recording/reproducing device 106, in accordance with the present invention. Identical reference characters are assigned to elements having the same or similar function in FIGS. 1, 4 and 5. In addition, those signal paths in FIG. 4 pertaining only to the recording operation are omitted for clarity in FIG. 5 illustrating the reproducing operation.

As shown in FIG. 5, the recording/reproducing block 42 accesses the recorded transport stream in the recording medium and sends it to the filter block 43. In the filter block 43, the error processing block 436 sets the "EF" field to "1" if an error occurs during the recording/reproducing operation. In addition, the VBV Buffer UF processing block 435 changes the "UF" field to "1" while the recording/reproducing block 42 performs a trick play. Following the above operations, the transport stream is outputted to the link layer control block 44 through the recording/reproducing switch SW1. Further, the transport stream is outputted from the transceiver 441 to the physical layer control block 45, and sent to the set top box 104 via the IEEE 1394 serial bus interface 110.

The isochronous data block packet is then transmitted to the link layer control block 35 (in particular, to the transceiver 353) through the physical layer control block 36 in the set top box 104. The transceiver 353 also provides the contents of the "TF", "MS", and "Channel Information" fields from the CFR 351 for subsequent use by the CPU 31.

When the "TF" field is "1", the CPU 31 performs the appropriate processing operations in view of the fact that there is a transition point in the transport stream received from the transceiver 353. The updated tables (PAT, PMT, and SIT) are then obtained from the transport control block 33 by the CPU 31. The contents of the program contained in the transport stream are determined on the basis of the "MS" and "Channel Information" fields. The CPU 31 combines the information from these fields with the table information for obtaining an ID of the video data packet, audio data packet, and other data packets, such that these packets can be properly supplied to the corresponding video and audio decoders, as well as other packet processing blocks in the decoder 34.

As further shown in FIG. 5, if there is an error in the transport stream packet, the link layer control block 35 outputs an error information to the transport control block 33 (that is, the "EF" field is changed to "1").

Also, if the "UF" field is "1", the decoder 34 does not perform the system reset despite the underflow in the VBV buffer 341. Only intraframes are decoded in response to the trick play mode.

Having described specific preferred embodiments of the invention with reference to the accompanying drawings, it is to be understood that the invention is not limited to those precise embodiments. For example, other apparatus can be used in place of the afore-described set top box for separating and demodulating received programs. Hence, various changes and modifications may be effected by one skilled in the art without departing from the scope or the spirit of the invention as defined in the appended claims.

What is claimed is:

1. Apparatus for processing an MPEG encoded transport stream carrying a plurality of packets with program contents, comprising:

a controllable processor for attaching to each of the packets respective additional data; and a control block for transmitting/receiving said additional data with each of the packets;

wherein said additional data includes first information for indicating a clock value which is synchronized with a clock in a MPEG decoder, second information for indicating whether or not there is an error in said MPEG encoded transport stream, and third information for indicating a transition point in said transport stream.

2. The apparatus according to claim 1, wherein said additional data further includes fourth information for indicating validity of said first information.

3. A digital recording/reproducing device for processing an MPEG encoded transport stream carrying a plurality of packets with program contents, comprising:

a recording/reproducing block for recording/reproducing said MPEG encoded transport stream to/from a recording medium, wherein each of the packets has attached respective additional data; and a control block for transmitting/receiving said additional data with each of the packets;

wherein said additional data includes first information for indicating a clock value which is synchronized with a clock in a MPEG decoder, second information for indicating whether or not there is an error in said MPEG encoded transport stream, and third information for indicating a transition point in said transport stream.

4. The apparatus according to claim 3, wherein said additional data further includes fourth information for indicating validity of said first information.

5. A method for processing a plurality of MPEG encoded transport streams, each carrying a plurality of packets with program contents, comprising the steps of:

selecting an MPEG encoded transport stream from said plurality of transport streams;

generating additional data including first information for indicating a clock value which is synchronized with a clock in a MPEG decoder, second information for indicating whether or not there is an error in said MPEG encoded transport stream, and third information for indicating a transition point in of said transport stream;

attaching respective additional data to each of the packets; and transmitting said selected transport stream and said additional data with each of the packets.

6. The method according to claim 5, wherein said additional data further includes fourth information for indicating validity of said first information.

7. The apparatus according to claim 1, wherein said clock value is for recording the transport stream.

8. The apparatus according to claim 1, wherein said transition point occurs where recording operation for said transport stream stops and then restarts, such that said third information indicates recording has begun from said transition point.

9. The apparatus according to claim 1, wherein said additional data further includes:

fourth information indicating whether said transport stream contains a single channel or multiple channels, and fifth information indicating channel information, where the contents of said fifth information depend on the value of said fourth information.

10. The apparatus according to claim 9, wherein said fifth information indicates a number of programs in said transport stream when said fourth information indicates said transport stream contains a single channel, and said fifth information indicates a number of channels in said transport stream when said fourth information indicates said transport stream contains multiple channels.

11. The digital recording/reproducing device according to claim 3, wherein said clock value is for recording the transport stream.

12. The digital recording/reproducing device according to claim 3, wherein said transition point occurs where recording operation for said transport stream stops and then restarts, such that said third information indicates recording has begun from said transition point.

13. The digital recording/reproducing device according to claim 3, wherein said additional data further includes:

fourth information indicating whether said transport steam contains a single channel or multiple channels, and fifth information indicating channel information, where the contents of said fifth information depend on the value of said fourth information.

14. The digital recording/reproducing device according to claim 13, wherein said fifth information indicates a number of programs in said transport stream when said fourth information indicates said transport stream contains a single channel, and said fifth information indicates a number of channels in said transport stream when said fourth information indicates said transport stream contains multiple channels.

15. The method according to claim 5, wherein said clock value is for recording the transport stream.

16. The method according to claim 5, wherein said transition point occurs where recording operation for said transport stream stops and then restarts, such that said third information indicates recording has begun from said transition point.

17. The method according to claim 5, wherein said additional data further includes:

fourth information indicating whether said transport stream contains a single channel or multiple channels, and fifth information indicating channel information, where the contents of said fifth information depend on the value of said fourth information.

18. The method according to claim 17, wherein said fifth information indicates a number of programs in said transport stream when said fourth information indicates said transport stream contains a single channel, and said fifth information indicates a number of channels in said transport stream when said fourth information indicates said transport stream contains multiple channels.

\* \* \* \* \*